(12) United States Patent
Grodnik et al.

(10) Patent No.: US 7,627,785 B1
(45) Date of Patent: Dec. 1, 2009

(54) CAPTURING MACHINE STATE OF UNSTABLE JAVA PROGRAM

(75) Inventors: Jesse Grodnik, San Francisco, CA (US); Cliff W. Draper, Emerald Hills, CA (US); Chris Webster, Dublin, CA (US); Venkatesar Amirisetty, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 935 days.

(21) Appl. No.: 10/890,048

(22) Filed: Jul. 12, 2004

(51) Int. Cl.
*G06F 11/00* (2006.01)
(52) U.S. Cl. .......................... 714/38; 714/46
(58) Field of Classification Search .................. 714/38, 714/45, 46; 717/128, 129, 127
See application file for complete search history.

(56) References Cited

U.S. PATENT DOCUMENTS

| | | | | |
|---|---|---|---|---|
| 6,282,701 B1 * | 8/2001 | Wygodny et al. | ........... | 717/125 |
| 6,457,142 B1 * | 9/2002 | Klemm et al. | ................ | 714/38 |
| 6,701,454 B1 * | 3/2004 | Fischer et al. | ................ | 714/15 |
| 6,738,928 B1 * | 5/2004 | Brown | ........................ | 714/26 |
| 6,745,350 B1 * | 6/2004 | Cline et al. | ................... | 714/49 |
| 6,862,696 B1 * | 3/2005 | Voas et al. | ..................... | 714/38 |
| 6,915,449 B2 * | 7/2005 | Bantz et al. | .................... | 714/15 |
| 7,114,104 B1 * | 9/2006 | Bennett | ....................... | 714/38 |
| 7,191,364 B2 * | 3/2007 | Hudson et al. | ................ | 714/38 |
| 7,243,267 B2 * | 7/2007 | Klemm et al. | ................ | 714/38 |
| 2003/0208593 A1 * | 11/2003 | Bharati et al. | ............... | 709/224 |

* cited by examiner

*Primary Examiner*—Michael C Maskulinski
*Assistant Examiner*—Elmira Mehrmanesh
(74) *Attorney, Agent, or Firm*—Osha•Liang LLP

(57) ABSTRACT

Mechanisms and methods for capturing an execution state of a failing program in a computing environment are disclosed. Embodiments can enable detection of user initiated program terminations and error information capture without incurring the overhead of a separate monitoring process. It is possible to obtain an execution trace and related state information in the event that a program has incurred a program error causing the user to terminate the program.

4 Claims, 10 Drawing Sheets

```
"AWT-EventQueue-0" prio=7 tid=0x1744D308 nid=0x660 in Object.wait() [17d5f000..17d5fd8c]
    at java.lang.Object.wait(Native Method)
    - waiting on <02F70498> (a org.openide.util.Mutex$QueueCell)    ~302
    at java.lang.Object.wait(Object.java:426)
    at org.openide.util.Mutex$QueueCell.sleep(Mutex.java:1172)
    - locked <02F70498> (a org.openide.util.Mutex$QueueCell)
    at org.openide.util.Mutex.enter(Mutex.java:486)
    at org.openide.util.Mutex.postRequest(Mutex.java:873)
    at org.openide.util.Mutex.postWriteRequest(Mutex.java:375)
    at org.openide.nodes.Children.getArray(Children.java:489)
    at org.openide.nodes.Children.getNodes(Children.java:316)
    at org.openide.nodes.FilterNode$ChildrenAdapter.run(FilterNode.java:1169)
    at org.openide.nodes.FilterNode$Children.updateKeys(FilterNode.java:1126)
    at org.openide.nodes.FilterNode$Children.addNotifyImpl(FilterNode.java:1023)
    at org.openide.nodes.FilterNode$Children.addNotify(FilterNode.java:1015)
    at org.openide.nodes.Children.callAddNotify(Children.java:420)
    at org.openide.nodes.Children.getArray(Children.java:463)
    at org.openide.nodes.Children.getNodes(Children.java:316)
    at org.openide.explorer.view.VisualizerNode.getChildren(VisualizerNode.java:169)
```

*Fig. 3A*

Full thread dump Java Client VM (1.4.1_06-b01 mixed mode):

"FolderChildren_Refresh" daemon prio=2 tid=0x18710660 nid=0x464 waiting for monitor entry [19e2f000..19e2fd8c]
   at org.openide.filesystems.Repository.addFileSystem(Repository.java:153)
   - waiting to lock <03F4C398> (a org.netbeans.core.NbRepository) ~312
   at com.sun.forte4j.j2ee.lib.dataobject.J2EEJarFileSystem.J2EEJarFileSystemFactory(J2EEJarFileSystem.java:119)
   at com.sun.forte4j.j2ee.lib.dataobject.J2EEJarDataObject.mountJfs(J2EEJarDataObject.java:117)
   at com.sun.forte4j.j2ee.j2eeconn.J2EEConnDataObject.refreshChildren(J2EEConnDataObject.java:233)
   at com.sun.forte4j.j2ee.lib.dataobject.J2EEJarDataObject.getDisplayName(J2EEJarDataObject.java:103)
   at com.sun.forte4j.j2ee.j2eeconn.J2EEConnDataNode.<init>(J2EEConnDataNode.java:94)
   at com.sun.forte4j.j2ee.j2eeconn.J2EEConnDataNode.<init>(J2EEConnDataNode.java:88)
   at com.sun.forte4j.j2ee.j2eeconn.J2EEConnDataObject.createNodeDelegate(J2EEConnDataObject.java:101)
   at org.openide.loaders.DataObject$1.run(DataObject.java:242) ~314
   - locked <06387DD8> (a java.lang.Object)
   at org.openide.util.Mutex.readAccess(Mutex.java:239)
   at org.openide.loaders.DataObject.getNodeDelegate(DataObject.java:238)

*Fig. 3B*

"Automount" daemon prio=2 tid=0x17E3DCB8 nid=0xb18 in Object.wait() [19c2f000.. 19c2fd8c]
   at java.lang.Object.wait(Native Method)
   - waiting on <06387F18> (a org.openide.util.Mutex$QueueCell) ─322
   at java.lang.Object.wait(Object.java:426)
   at org.openide.util.Mutex$QueueCell.sleep(Mutex.java:1172)
   - locked <06387F18> (a org.openide.util.Mutex$QueueCell)
   at org.openide.util.Mutex.enter(Mutex.java:486)
   at org.openide.util.Mutex.postRequest(Mutex.java:873)
   at org.openide.util.Mutex.postWriteRequest(Mutex.java:375)
   at org.openide.nodes.Children$Keys.applyKeys(Children.java:1882)
   at org.openide.nodes.Children$Keys.setKeys(Children.java:1841)
   at org.netbeans.core.DataSystem$DSMap.refresh(DataSystem.java:263)
   at org.netbeans.core.DataSystem.refresh(DataSystem.java:178)
   at org.netbeans.core.DataSystem.refresh(DataSystem.java:171)
   at org.netbeans.core.DataSystem.fileSystemPoolReordered(DataSystem.java:165)
   at org.openide.util.WeakListener$Repository.fileSystemPoolReordered(WeakListener.java:665)
   at org.openide.filesystems.Repository.fireFileSystemReordered(Repository.java:496)
   at org.openide.filesystems.Repository.reorder(Repository.java:247)
   at org.netbeans.core.AutomountSupport.updateFileSystems(AutomountSupport.java:586) ─324
   - locked <03F4C398> (a org.netbeans.core.NbRepository)
   at org.netbeans.core.AutomountSupport.taskFinished(AutomountSupport.java:168)
   at org.openide.util.Task.notifyFinished(Task.java:121)
   at org.openide.loaders.FolderInstance.defaultProcessObjects(FolderInstance.java:720)
   at org.openide.loaders.FolderInstance.access$000(FolderInstance.java:69)
   at org.openide.loaders.FolderInstance$2.run(FolderInstance.java:592)
   at org.openide.util.Task.run(Task.java:136)
   at org.openide.util.RequestProcessor$Task.run(RequestProcessor.java:328)
   at org.openide.util.RequestProcessor$Processor.run(RequestProcessor.java:670)

"Module-Actions" daemon prio=2 tid=0x00AA4D28 nid=0xadc waiting for monitor entry [1920f000..1920fd8c]
   at org.openide.filesystems.Repository.addFileSystem(Repository.java:153)
   - waiting to lock <03F4C398> (a org.netbeans.core.NbRepository)
   at com.sun.forte4j.j2ee.lib.dataobject.J2EEJarFileSystem.J2EEJarFileSystemFactory(J2EEJarFileSystem.java:119)
   at com.sun.forte4j.j2ee.lib.dataobject.J2EEJarDataObject.mountJfs(J2EEJarDataObject.java:117)
   at com.sun.forte4j.j2ee.j2eeconn.J2EEConnDataObject.refreshChildren(J2EEConnDataObject.java:233)

*Fig. 3C*

CAPTURING MACHINE STATE OF UNSTABLE JAVA PROGRAM

BACKGROUND

Computer programming errors, commonly known as "bugs," can result in partial or total failure of computer programs. Some computer program failures may be intermittent, and therefore cannot be easily reproduced. This intermittent characteristic of certain program errors can frustrate efforts to resolve the error. It is desirable to be able to characterize the program error so that it can be fixed by the software engineering organizations that developed the computer program. One type of computer error experienced by Java application programs, for example, is an unresponsive ("program freeze") or unstable user interface. In this class of program errors, the application user has limited recourse to determine the execution state of the program at the time of the failure because the program has become unresponsive.

Many machines, such as Java machines, employ an execution trace for each thread for localizing the cause of program errors. The execution trace provides a list of the current call stack for each thread. The current call stack is the list of methods that have not yet finished (which is why the term stack is used). As a method finishes, the entry representing the method is removed from the call stack and thus from the execution trace output. While the execution trace can serve to confirm that the program has indeed failed, the information contained in such traces is lost when the user terminates the program.

In conventional approaches to collecting information about failing application programs, a dedicated monitoring process may be launched to watch over the program executing on a server. Should the server fail, the monitor process can be accessed by a user to determine the state to the server at the time of the failure. In such conventional approaches, the machine supporting the program must perform information collection tasks after the program error has occurred, often when the machine is in an ambiguous state. A monitoring process will not be able to detect certain classes of errors (for instance when threads are waiting for a notification which will never occur). Further, these conventional approaches can incur additional delay that frustrates the user, who has just experienced the program error and now must endure the situation in which there is no reliable mechanism for resolving the difficulty.

Accordingly, none of the conventional approaches enables capturing an execution state of a failing program in the event that a program has incurred a program error causing the user to terminate the program.

SUMMARY

In accordance with one embodiment of the present invention, there is provided a mechanism for capturing an execution state of a failing program. With this mechanism, it is possible to obtain an execution trace and related state information in the event that a program has incurred a program error causing the user to terminate the program.

In one example embodiment, the present invention provides a method that includes detecting a user intervention initiating an abnormal termination of a program. Information about an execution state at the time of the user initiated abnormal termination is collected and stored. Subsequently, after the user restarts the program, the fact that a prior instance of the program incurred a user initiated abnormal termination is detected based upon a presence of stored information about the execution state. Information about reasons that the user abnormally terminated the prior instance of the program may be collected and stored. This information, along with the information about the execution state at the time of the user initiated abnormal termination can be sent to a third party at the option of the user.

The mechanisms and methods for capturing the execution state of an unstable program enable obtaining the execution trace and related state information in the event that a program has incurred a program error causing the user to terminate the program. Obtaining the execution trace and related state information, in the event that a program has incurred a program error causing the user to terminate the program, makes it possible to obtain diagnostic information that would otherwise be lost when the program terminates.

BRIEF DESCRIPTION OF THE DRAWINGS

FIGS. 3A-3C are diagrams illustrating an execution trace from an example application in one embodiment of the present invention.

DETAILED DESCRIPTION OF EMBODIMENT(S)

In accordance with one embodiment of the present invention, there is provided a mechanism for capturing an execution state of an unstable program in a computing environment. Embodiments can enable detection of user initiated program terminations and error information capture without incurring the overhead of a separate monitoring process. With this mechanism, it is possible to obtain an execution trace and related state information in the event that a program has incurred a program error causing the user to terminate the program.

In one example embodiment, a method for capturing the execution state of an unstable program includes detecting a user intervention initiating an abnormal termination of a program. Information about an execution state at the time of the user initiated abnormal termination is collected and stored. Subsequently, after the user restarts the program, the fact that a prior instance of the program incurred a user initiated abnormal termination is detected based upon a presence of stored information about the execution state. Information about reasons that the user abnormally terminated the prior instance of the program may be collected and stored. This information, along with the information about the execution state at the time of the user initiated abnormal termination can be sent to a third party at the option of the user.

Figure 1:
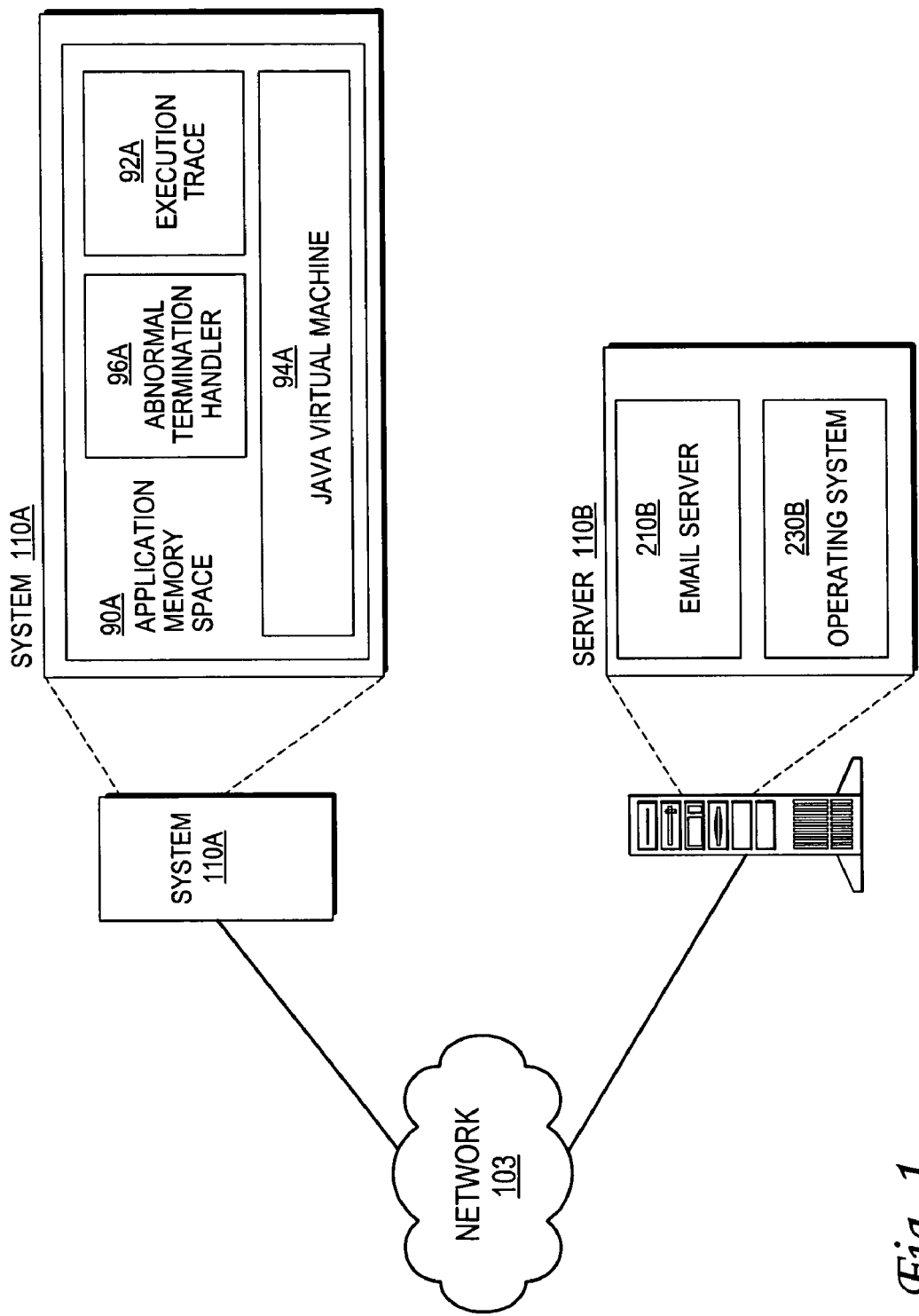
FIG. 1 is a functional block diagram of an example computing environment in which one embodiment of the present invention may be implemented.

FIG. 1 is a functional block diagram of an example computing environment in which a user initiated program termination may be detected in accordance with one embodiment of the present invention. While the invention is illustrated generally with reference to an example of application programs executing in a Java virtual machine environment, the present invention does not require this type of environment, and in some embodiments, techniques according to the invention may be implemented in devices having other types of computing environments, such as a POSIX C runtime system, for example, in which an embodiment can provide a means for detecting and acting on user termination events and a means for capturing program state information during shutdown.

As shown in FIG. 1, a system 110A is connected to a network 103, which provides connectivity to a system 110B. System 110A may be any kind of computer or programmable device, but in the example embodiment illustrated by FIG. 1, system 110A is a general purpose computer. Hardware components of system 110A are described herein below in further detail with reference to FIG. 4. Network 103 may be any type of network, however in one embodiment; network 103 comprises a packet network.

In the embodiment illustrated by FIG. 1, system 110A includes one or more components, which perform processing to enable users to obtain services from applications (not shown) either available locally on system 110A or on other systems (not shown) through network 103. As further illustrated by FIG. 1, system 110A includes an application memory space 90A (hereinafter "application 90A") comprising an abnormal termination handler 96A, Java Virtual Machine 94A and an execution trace 92A. Application 90A is embodied as a Java program that executes in the environment provided by the Java Virtual Machine 94A. In one embodiment, an application 90A includes executable user interface code (not shown) that performs processing to enable a system 110A to send execution trace information to a maintenance organization using system 110B by email using simple mail transfer protocol (SMTP). In other embodiments, other means for communicating the execution trace information to a maintenance organization may be used, such as without limitation, connection to a web site using hypertext transfer protocol (HTTP), transferring a file using file transfer protocol (FTP) or the like.

In the embodiment illustrated by FIG. 1, system 110B includes one or more components that receive and process execution traces from applications at systems such as system 110A via network 103. As further illustrated by FIG. 1, system 110B includes a mail server 210B that receives emails that report abnormal terminations of applications on system 110A. An operating system 230B supports the mail server 210B and any other components deployed on the hardware of system 110B.

In the event that an error or other unusual machine behavior is detected by the user, the user may decide to terminate the application 90A. In such case, abnormal termination handler 96A will perform processing to detect that the user has initiated the abnormal termination of a program. The abnormal termination handler 96A collects state information that captures a current execution state of the program. This information may be stored by the abnormal termination handler 96A in an execution trace 92A, for example. Optionally, the abnormal termination handler 96A may send the state information to a third party, such as a maintenance organization supporting the program, for example.

In one embodiment, the application 90A is terminated in accordance with the user's desires. The application 90A may be restarted at a subsequent time. The abnormal termination handler 96A detects that the application 90A was previously abnormally terminated by the user and collects diagnostic information, including state information, and sends the diagnostic information to a third party. Optionally, the abnormal termination handler 96A may prompt the user for permission prior to sending the state information to a third party.

Optionally, the abnormal termination handler 96A may solicit information from the user as to why the user terminated the previous execution of the program. This user information is included with the diagnostic information sent to the third party. In one example embodiment, soliciting information from a user includes displaying a user interface that solicits from a user information about reasons that the user abnormally terminated the prior instance of the program. Any responses received from the user as about reasons that the user abnormally terminated the prior instance of the program are stored with the diagnostic information.

In one embodiment, the abnormal termination handler 96A is embodied as a shutdown hook that is registered with the JAVA virtual machine 94A. The abnormal termination handler determines based upon a flag that the user has requested an abnormal termination of application 90A. The abnormal termination handler then performs collecting and saving the information about the execution state of the application and initiates shut down of the application 90A.

In various specific embodiments, a variety of state information can be collected. For example, collecting information about the current execution state of the application 90A can include, without limitation, recording information about each executing thread, such as a name of each executing thread, a line number of a last executed program line for each thread, an identifier for an object which is locked and an identifier of the object for which a thread is waiting to lock and a current execution trace. Further, in some embodiments, execution trace for each thread may be obtained from an interpreter.

Figure 2A:
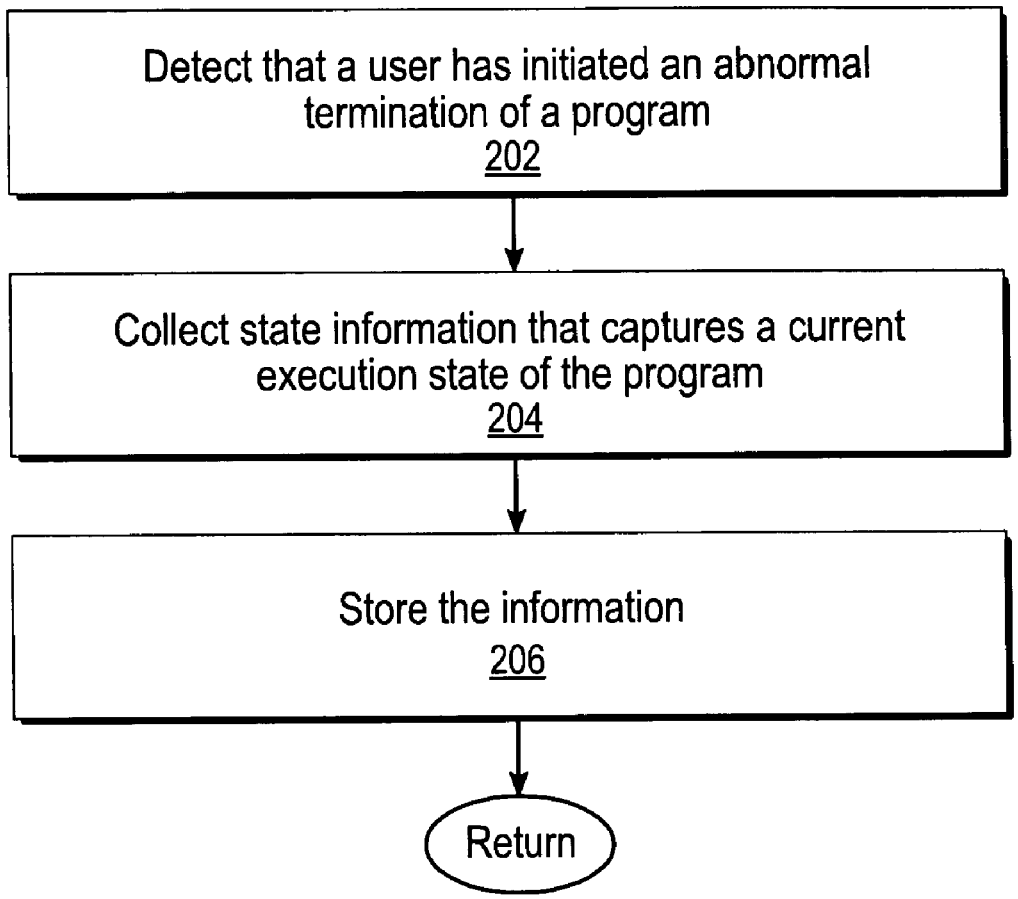
FIGS. 2A-2E are operational flow diagrams illustrating the operation of one embodiment of the present invention.

FIGS. 2A-2E are operational flow diagrams illustrating the operation of one embodiment of the present invention. An operational flow diagram, which provides a high level overview of one embodiment of the present invention, is shown in FIG. 2A.

In one embodiment, the abnormal termination handler 96A detects that a user has initiated an abnormal termination of a program (block 202). State information that captures a current execution state of the program is collected (block 204). The state information is then stored locally (block 206).

Figure 2B:
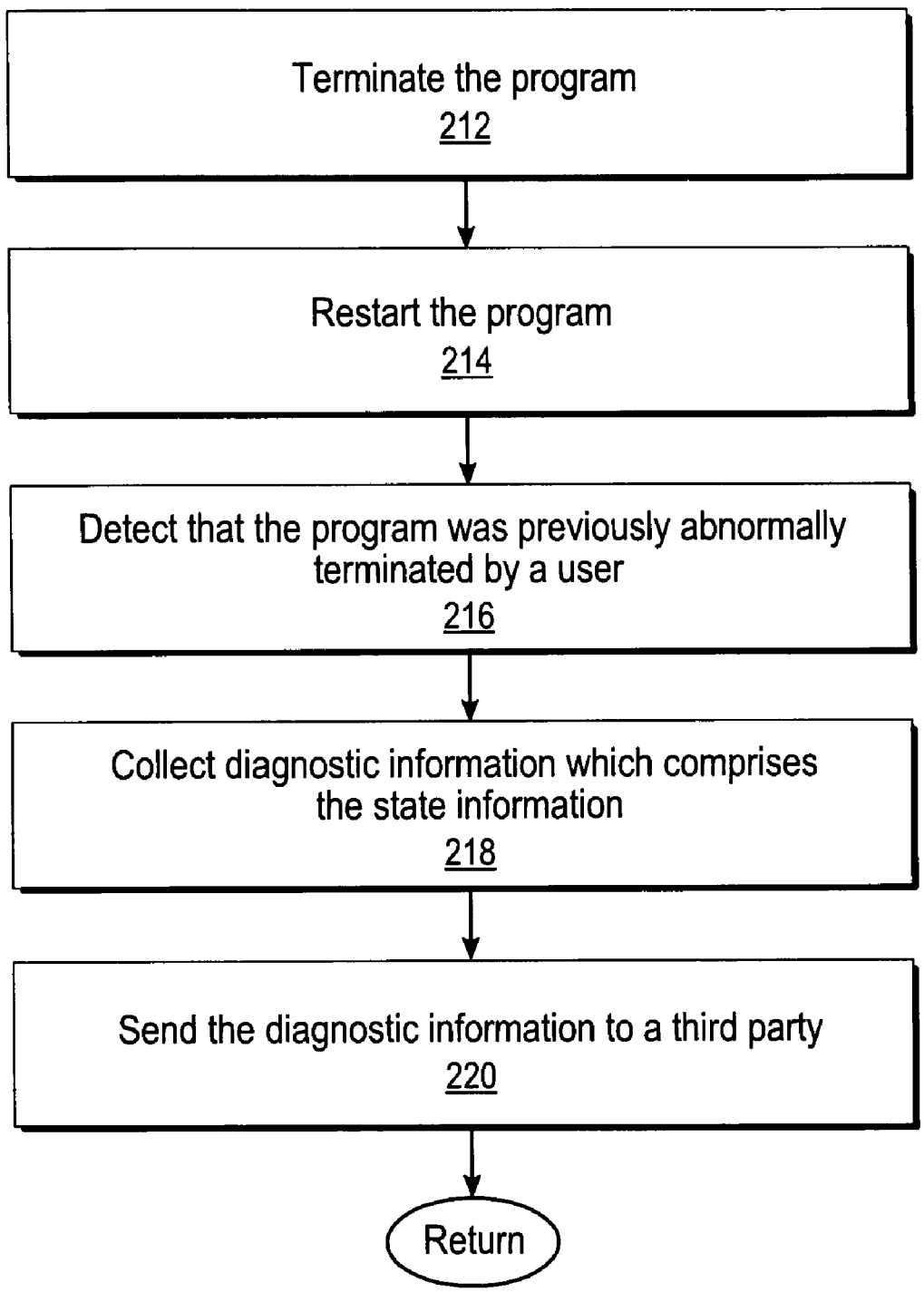

Now with reference to FIG. 2B, the program is terminated (block 212). The program is restarted (block 214). That the program was previously abnormally terminated in accordance with input from a user is detected (block 216). Diagnostic information is collected (block 218). The diagnostic information includes the state information about the execution state of the program. The diagnostic information is sent to a third party (block 220).

Figure 2C:
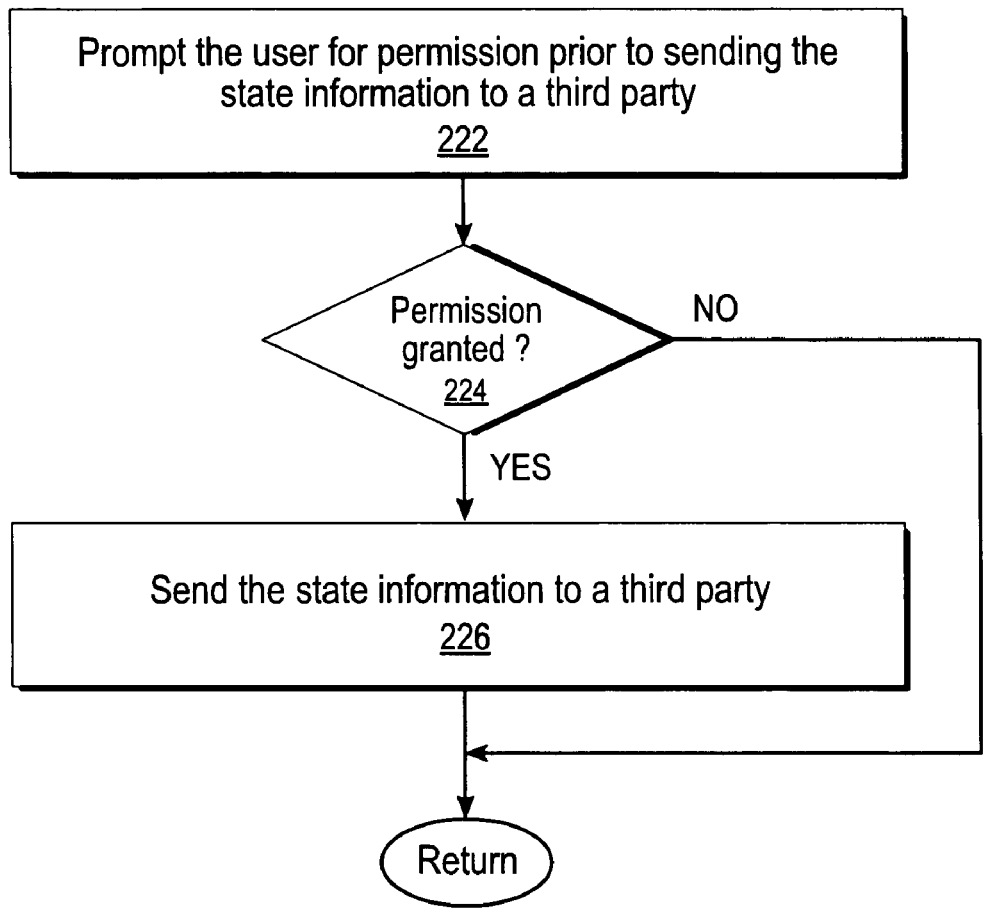

Now with reference to FIG. 2C, the user is prompted for permission prior to sending the state information to a third party (block 222). In block 224, a test is performed to determine if the user has permitted the state information to be sent. If the user has permitted the state information to be sent, then, the state information is sent to a third party (block 226).

Figure 2D:
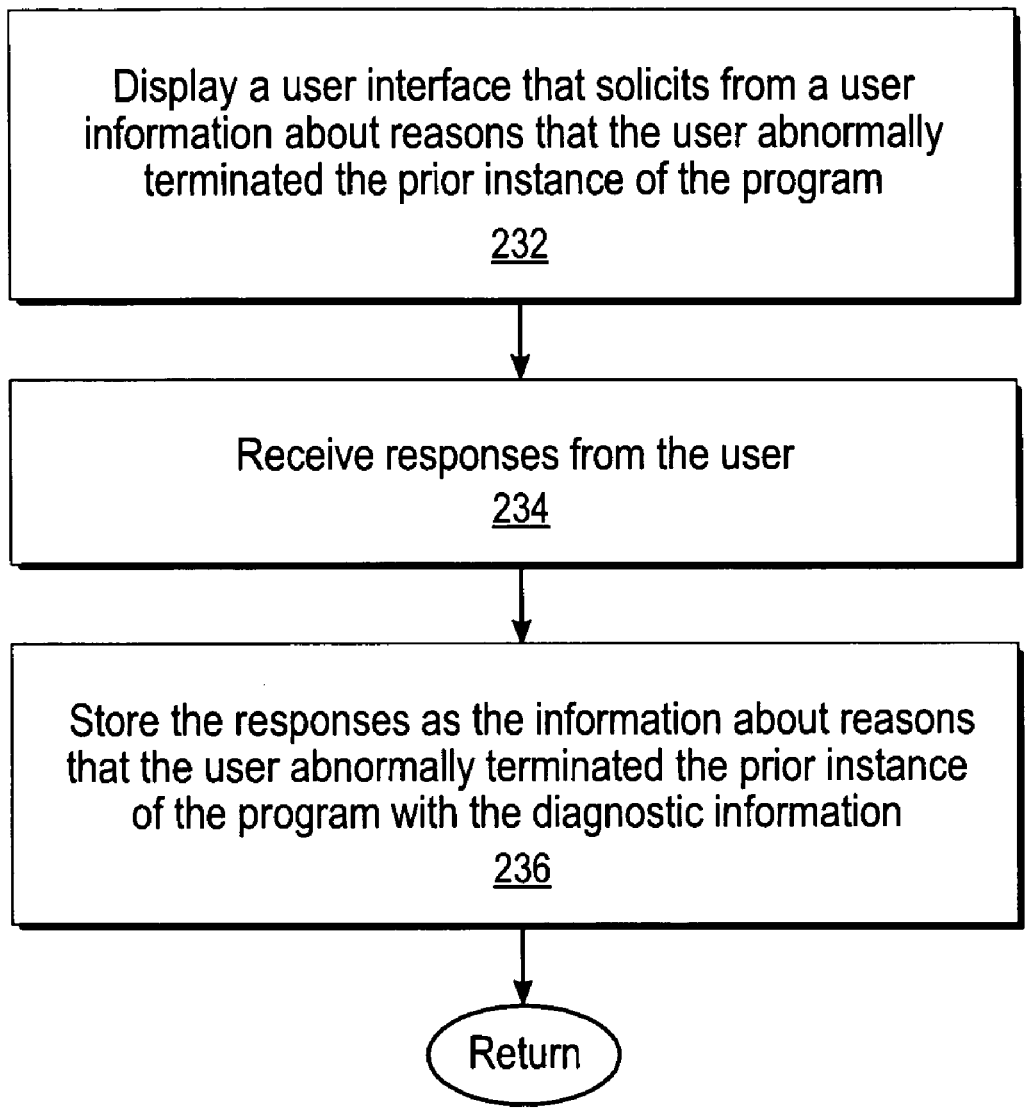

Now with reference to FIG. 2D, a user interface that solicits from a user information about reasons that the user abnormally terminated the prior instance of the program is displayed (block 232). A response is received from the user (block 234). The response is stored as the information about reasons that the user abnormally terminated the prior instance of the program with the diagnostic information (block 236).

Figure 2E:
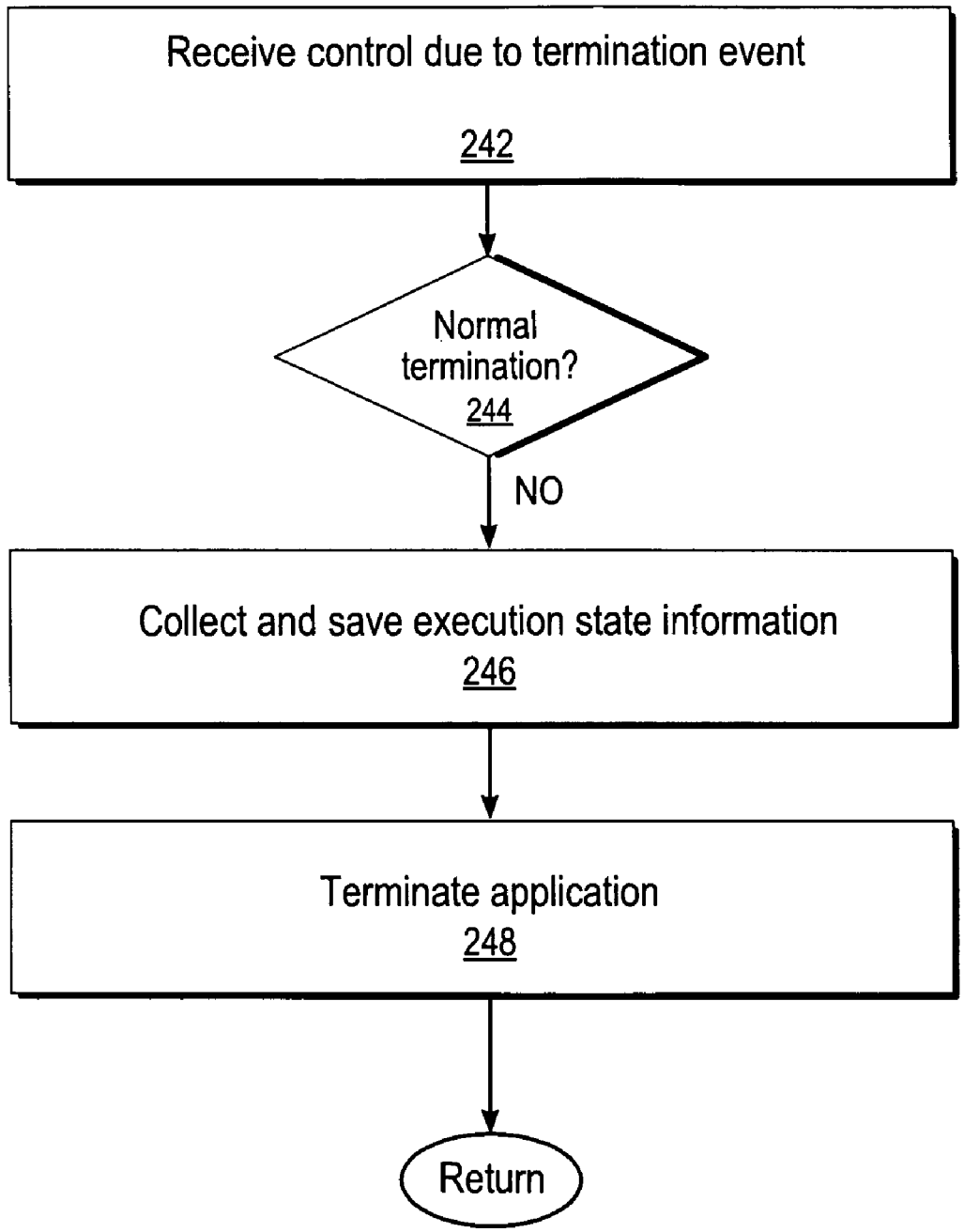

Now with reference to FIG. 2E, the abnormal termination handler 96A is registered as a shutdown hook with the JAVA virtual machine 94A. When a user invokes a normal termination, such as by using a menu selection, the application 90A sets a "normal termination flag" to indicate to the shutdown hook that a normal termination has occurred. In the event that the user detects an abnormal situation, such as a "hung" machine, abnormal delay or abnormal output, the user may initiate an abnormal termination. The user may abnormally terminate the program by making an input, such as invoking the task manager to terminate a program or pressing a "break key," that invokes the Java Virtual Machine 94A to cause the program to shut down.

In the event of either a normal or abnormal shutdown request, the Java Virtual Machine 94A invokes the abnormal termination handler in response to the shutdown request. The abnormal termination handler receives control due to the shut down event (block 242). The abnormal termination handler checks the state of the "normal termination" flag and discovers that the flag has not been set (block 244). Accordingly, the abnormal termination handler 96A determines based upon the flag that the user has requested an abnormal termination of application 90A. The abnormal termination handler then collects the information about the execution state of the application 90A and saves this information in the execution trace 92A (block 246). Then the application 90A is shut down (block 248). In the event that the normal termination flag has been set by the application 90A, indicating a normal termination (block 244), the abnormal termination handler omits collecting information and saving the execution state and proceeds directly to shutting down the application 90A (block 248).

In other aspects, the invention encompasses in some embodiments, computer apparatus, computing systems and machine-readable media configured to carry out the foregoing methods.

FIGS. 3A-3C are diagrams illustrating an execution trace from an example application in one embodiment of the present invention. In FIGS. 3A-3C, three threads comprising an application have, due to a program error, entered a state in which each thread in a circle of threads is waiting on each other (known in computer science terms as a "deadlock"). The thread recording information in the example depicted by FIGS. 3A-3C is based on the identifier for the object (and not the name of the lock), the identifier of an object for which a thread is waiting, and the current execution stack for the thread.

As illustrated by FIG. 3A, example execution trace 300 includes a first thread named "AWT-EventQueue-0", which is the thread responsible for maintaining a user interface in this example application. Accordingly, thread "AWT-EventQueue-0" provides redrawing of the user interface, soliciting user input of actions to be taken, and dispatching the user input to appropriate modules for handling. As indicated by line 302 of FIG. 3A, the "AWT-EventQueue-0" thread is waiting on a mutex (a higher level abstraction of a lock) having a lock id of <02F70498>. The terms "mutex" and "lock" will be used interchangeably herein.

Now with reference to FIG. 3B, a second thread, named the "FolderChildren_Refresh" thread is also present in the example application. The "FolderChildren_Refresh" thread has locked the mutex that the "AWT-EventQueue-0" thread is waiting on, <06387DD8>, as indicated by line 314 of FIG. 3B. At the same time, however, the "FolderChildren_Refresh" thread is waiting on lock <03F4C398> as indicated by line 312 of FIG. 3B. In this example, the number is the system identifier of the locked object.

Now with reference to FIG. 3C, a third thread, named the "Automount" thread is also present in the example application. The lock <03F4C398> is held by the "Automount" thread, as indicated by line 324 of FIG. 3C. The "Automount" thread is also waiting for the first mutex, however, <06387F18> as indicated by line 322 of FIG. 3C. Accordingly, the execution traces of FIGS. 3A-3C demonstrate a deadlock caused by a "hold-and-wait scenario" as follows: (1) The FolderChildren_Refresh thread acquired read access to the node display system; (2) The Automount thread acquired a lock on the NbRepository instance (Singleton), as indicated by line 324 in FIG. 3C; (3) The FolderChildren_Refresh thread attempts to lock NbRepository but cannot so it is blocked, as indicated by 312 in FIG. 3B; (4) The Automount thread attempts to obtain write access to the node display system but cannot because this is held by the FolderChildren_Refresh thread, so execution of this thread is blocked; and (5) Other threads are blocked waiting for either the NbRepository or access to the node display system. The system becomes unresponsive as soon as the AWT-EventQueue-0 thread is blocked and a user would typically abort the program at this point.

When the user detected the deadlock state, he or she terminated the program with a user input. The abnormal termination handler 96A determined that the user initiated a termination because of the user's perception that the application 90A had entered an abnormal state and saved the execution trace 92A as shown in FIGS. 3A-3C. Because the execution trace information has been saved, software development personnel are able to determine which processes experienced the deadlock and which lock is the one being waited on. Accordingly, this information will be a valuable assistance to the software development organization in finding the root cause of the program error and resolving this problem.

Figure 4:
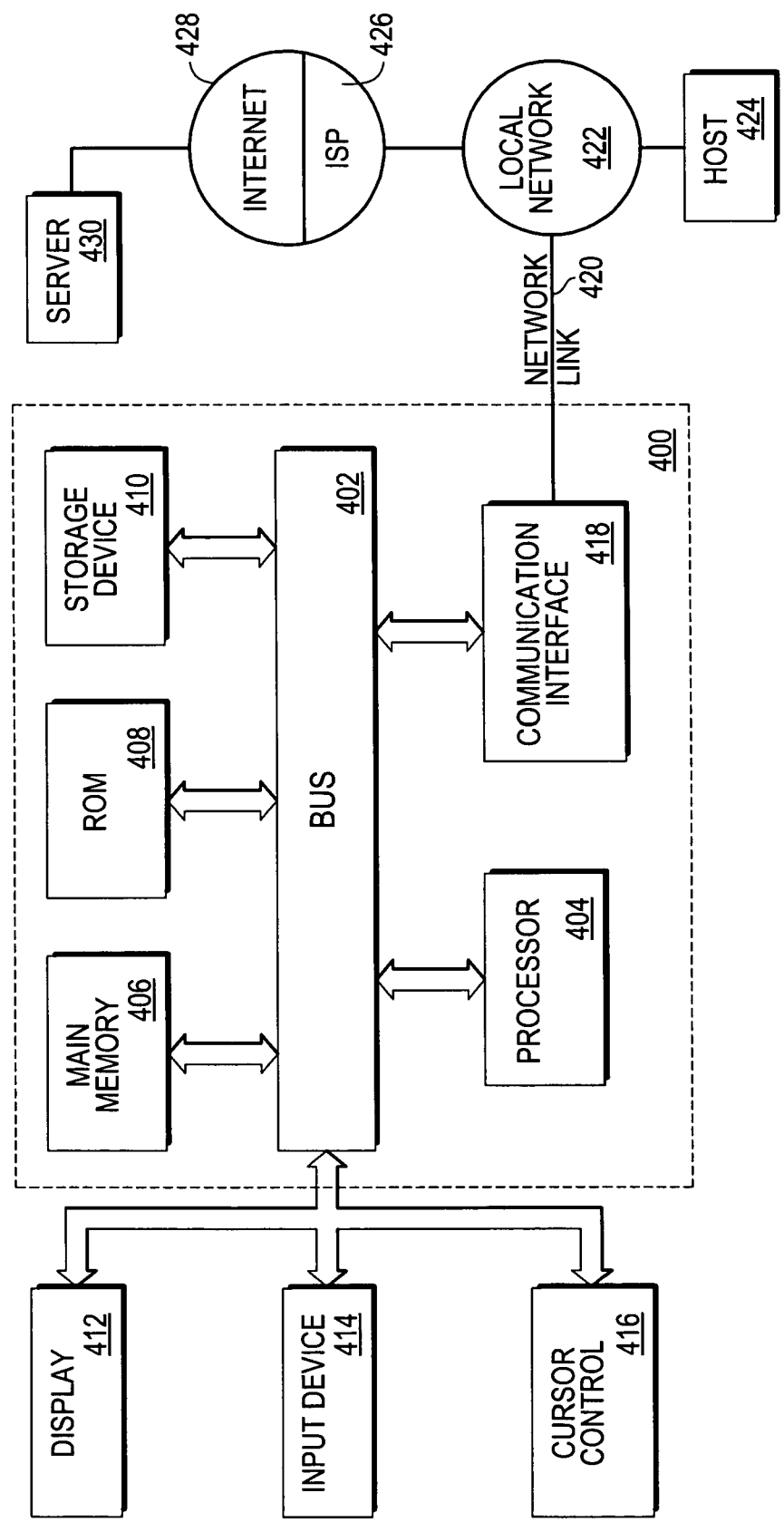
FIG. 4 is a hardware block diagram of an example computer system, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A machine implemented method, comprising:
   detecting a user intervention initiating an abnormal termination of a program;
   collecting and storing information about an execution state at the time of the user initiated abnormal termination;
   detecting based upon a presence of stored information about the execution state that a prior instance of the program incurred a user initiated abnormal termination, after the user restarts the program;
   in response to detecting that a prior instance of the program incurred a user initiated abnormal termination, soliciting information from the user about reasons that the user initiated the abnormal termination of the program;

receiving and storing information from the user about reasons that the user abnormally terminated the prior instance of the program; and sending the information about the execution state at the time of the user initiated abnormal termination and the information about reasons that the user abnormally terminated the prior instance of the program to a third party.

2. A computer-readable storage medium carrying one or more sequences of instructions for gathering information about an abnormally terminated program, which instructions, when executed by one or more processors, cause the one or more processors to carry out the steps of:

detecting a user intervention initiating an abnormal termination of a program;

collecting and storing information about an execution state at the time of the user initiated abnormal termination;

detecting based upon a presence of stored information about the execution state that a prior instance of the program incurred a user initiated abnormal termination, after the user restarts the program;

in response to detecting that a prior instance of the program incurred a user initiated abnormal termination, soliciting information from the user about reasons that the user initiated the abnormal termination of the program;

receiving and storing information from the user about reasons that the user abnormally terminated the prior instance of the program; and sending the information about the execution state at the time of the user initiated abnormal termination and the information about reasons that the user abnormally terminated the prior instance of the program to a third party.

3. An apparatus for capturing an execution state of a failing program, comprising:

a processor a memory; connected to the processor by a bus; and one or more stored sequences of instructions which, when executed by the processor, cause the processor to carry out the steps of:

detecting a user intervention initiating an abnormal termination of a program;

collecting and storing information about an execution state at the time of the user initiated abnormal termination;

detecting based upon a presence of stored information about the execution state that a prior instance of the program incurred a user initiated abnormal termination, after the user restarts the program;

in response to detecting that a prior instance of the program incurred a user initiated abnormal termination, soliciting information from the user about reasons that the user initiated the abnormal termination of the program, receiving and storing information from the user about reasons that the user abnormally terminated the prior instance of the program; and sending the information about the execution state at the time of the user initiated abnormal termination and the information about reasons that the user abnormally terminated the prior instance of the program to a third party.

4. An apparatus, comprising:

means for detecting a user intervention initiating an abnormal termination of a program;

means for collecting and storing information about an execution state at the time of the user initiated abnormal termination;

means for detecting based upon a presence of stored information about the execution state that a prior instance of the program incurred a user initiated abnormal termination, after the user restarts the program;

means for soliciting information from the user about reasons that the user initiated the abnormal termination of the program in response to detecting that a prior instance of the program incurred a user initiated abnormal termination;

means for receiving and storing information from the user about reasons that the user abnormally terminated the prior instance of the program; and means for sending the information about the execution state at the time of the user initiated abnormal termination and the information about reasons that the user abnormally terminated the prior instance of the program to a third party.

* * * * *

UNITED STATES PATENT AND TRADEMARK OFFICE
CERTIFICATE OF CORRECTION

PATENT NO. : 7,627,785 B1  Page 1 of 1
APPLICATION NO. : 10/890048
DATED : December 1, 2009
INVENTOR(S) : Grodnik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1541 days.

Signed and Sealed this

Second Day of November, 2010

David J. Kappos
*Director of the United States Patent and Trademark Office*